United States Patent [19]
Dugan et al.

[11] 3,873,670
[45] Mar. 25, 1975

[54] FLUE GAS DESULFURIZATION IN MOLTEN MEDIA

[75] Inventors: John J. Dugan; Israel S. Pasternak, both of Sarnia, Ontario, Canada

[73] Assignee: Exxon Research and Engineering Company, Linden, N.J.

[22] Filed: Aug. 14, 1972

[21] Appl. No.: 280,187

[52] U.S. Cl.............. 423/210.5, 423/244, 423/242
[51] Int. Cl...... B01d 47/00, B01j 9/00, C01b 17/00
[58] Field of Search.............. 423/242-244, 210.5

[56] References Cited
UNITED STATES PATENTS

| | | | |
|---|---|---|---|
| 1,678,630 | 7/1928 | Bahr | 423/244 |
| 3,438,727 | 4/1969 | Heredy | 423/242 |
| 3,615,196 | 10/1971 | Welty et al. | 423/535 |
| 3,715,187 | 2/1973 | Bartholomew et al. | 423/242 |

FOREIGN PATENTS OR APPLICATIONS

| | | | |
|---|---|---|---|
| 893,818 | 2/1973 | Canada | 423/242 |
| 523,645 | 7/1940 | United Kingdom | 423/242 |

Primary Examiner—Edward J. Meros
Assistant Examiner—Gregory A. Heller
Attorney, Agent, or Firm—D. C. Caufield

[57] ABSTRACT

Sulfur oxides such as sulfur dioxide as well as nitrogen oxides are removed from flue gas by contacting the flue gas at elevated temperatures with a molten medium containing an alkali or alkaline earth metal oxide or hydroxide, including mixtures thereof, in combination with a glass-forming oxide such as an oxide of boron. The mole ratio of alkali or alkaline earth metal oxide or hydroxide expressed as the oxide thereof to the glass-forming oxide is preferably maintained in the range of at least one in order for the glass-forming oxide melts to act as an efficient absorbent for the removal of sulfur oxides. The molten media is regenerated in order to remove and recover the sulfur absorbed by the glass-forming oxide melts of the instant invention by reducing the metal sulfates and sulfites formed in the molten media to their sulfide form and thereafter contacting the metal sulfides with steam at temperatures up to about 2000°F. in order to recover the sulfur values as either an essentially dry, highly concentrated hydrogen sulfide stream or elemental sulfur, including mixtures thereof.

9 Claims, No Drawings

FLUE GAS DESULFURIZATION IN MOLTEN MEDIA

FIELD OF THE INVENTION

This invention relates to removing sulfur, predominantly sulfur oxides, from hot combustion gases by contacting the combustion gases containing the sulfur impurity with a molten media. More particularly, this invention relates to removing sulfur oxides such as sulfur dioxide from hot combustion gases normally referred to as flue gas by contacting the combustion gas with a molten medium containing an alkali or alkaline earth metal oxide or hydroxide in combination with a glass-forming oxide. In a particular embodiment of this invention, the mole ratio of the alkali or alkaline earth metal oxide or hydroxide to glass-forming oxide is maintained within a narrowly defined range such that the molten media provides a highly efficient method for removing sulfur oxides from combustion gases. The molten media is preferably regenerated by reducing the sulfur oxides absorbed by the melt as metal sulfates or sulfites to their sulfide form and thereafter contacting the metal sulfide in the molten media with steam at temperatures up to about 2000°F. to recover sulfur values from the melt while at the same time regenerating the molten media for further use in the process.

DESCRIPTION OF THE PRIOR ART

The suppression of sulfur oxide emissions into the atmosphere from all types of industrial plants has now become a national goal. Until recently, the recovery of sulfur from combustion gases emanating from power plants, as well as from refinery and chemical plants, has been pursued in order to obtain the sulfur value from the sulfur compounds which were heretofore passed into the atmosphere. The art is replete with various methods including the well-known wet processes employing an alkaline aqueous solution or slurry as well as the dry processes employing solid absorbents in order to remove and recover the sulfur compounds from the flue gases.

The absorption and recovery of sulfur in predominantly molten alkali metal carbonate systems has recently been proposed in order to remove sulfur oxides and specifically sulfur dioxides from hot combustion gases produced by the burning of a sulfur-containing hydrocarbon fuel, i.e. flue gas (see U.S. Pat. Nos. 3,438,733; 3,438,734; 3,516,796; 3,551,108; 3,438,727, 3,438,722 and 3,438,728). These techniques for absorbing and removing sulfur from a molten carbonate system basically involve the molten alkali carbonate initially absorbing the sulfur oxides to form alkali metal sulfites or sulfates. Thereafter, the alkali metal sulfites or sulfates may be reduced with a reducing agent to form the alkali metal sulfides and thereafter contacting the sulfide with a gaseous mixture containing steam and carbon dioxide in order to form hydrogen sulfide while at the same time regenerating the alkali metal carbonate for recirculation in the process (see U.S. Pat. No. 3,438,728 and *Chemical Engineering Progress*, 1969, pp. 73 et seq.

SUMMARY OF THE INVENTION

It has now been discovered that a molten media system containing an alkali or alkaline earth metal oxide or hydroxide including mixtures thereof in combination with a glass-forming oxide, when contacted with a hot combustion gas at elevated temperatures, is effective in absorbing sulfur oxides from the hot combustion gases. In addition, it has been discovered that when the mole ratio of the alkali or alkaline earth metal oxide or hydroxide expressed as the oxide thereof to the glass-forming oxide is maintained in the range of at least about 1, and preferably from about 1 to about 3, that such a molten glass media is a highly efficient and effective molten medium for removing sulfur oxides from hot combustion gases. Furthermore, as is disclosed and claimed in U.S. Ser. No. 280,184, filed Aug. 14, 1972, now U.S. Pat. No. 3,835,033 which application is hereby incorporated by reference, the sulfur oxides, predominantly sulfur dioxide which is absorbed by the molten media of the instant invention, can be recovered in order to regenerate the molten media of the instant invention by contacting the metal sulfides present in the molten media with steam at temperatures of up to about 2000°F. Furthur, it has been discovered that the molten media of the instant invention is effective in absorbing nitrogen oxides, and specifically nitric oxides from a typical hot combustion flue gas.

In accordance with the process of the instant invention, it has been surprisingly found that the facile, inexpensive method described above for absorbing sulfur oxides is due to the presence of a glass-forming oxide component in the molten media in combination with an alkali or alkaline earth metal oxide or hydroxide, including mixtures thereof. By glass-forming oxide, is meant an oxide of boron, silicon, germanium, arsenic, phosphorus, antimony, tellurium, silentium, molybdenum, tungsten, bismuth, aluminum, gallium, vanadium, titanium and mixtures thereof. Preferably, the glass-forming oxides are selected from the group consisting of oxides of boron, silicon, vanadium, molybdenum, tungsten, and mixtures thereof. The most preferred glass-forming oxide is an oxide of boron.

As mentioned above, the glass-forming oxides are employed in combination with an alkali or alkaline earth metal oxide or hydroxide, including mixtures thereof, to comprise the molten media which effectuates the absorption of sulfur oxides in accordance with the practice of the instant invention. The preferred alkali metal oxides or hydroxides include oxides or hydroxides of sodium, potassium, lithium, cesium, and mixtures thereof. The preferred alkaline earth metals which can be employed include the oxides and hydroxides of barium, strontium, calcium, and magnesium. While the alkaline earth metal oxides or hydroxides may be employed alone in combination with a glass-forming oxide, it is preferred that when employing alkaline earth metal oxide or hydroxide in a molten medium of the instant invention that alkali metal oxides or hydroxides be present in order to lower the melting point of the molten media to that temperature range preferred for conducting the flue gas desulfurization operation.

The mole ratio of the alkali metal compound, that is the mole ratio of the alkali metal(s) or alkaline earth metal(s) oxide or hydroxide expressed as the oxide thereof to the glass-forming oxide is an important feature of the instant invention. As mentioned above, it has been surprisingly discovered that when the mole ratio of the alkali or alkaline earth metal oxide(s) or hydroxide(s) expressed as the oxide thereof to the glass-forming oxide is at least about one and more preferably in the range of about 1 to about 3, there occurs an unexpected increase in the ability of the molten media to absorb sulfur oxides.

As mentioned above, the mole ratio of the alkali metal compound is defined in terms of the oxide(s) of the alkali or alkaline earth metal(s) that is employed in combination with the glass-forming oxide. The basis for defining the mole ratio of the alkali metal compound in terms of its oxide form, i.e., "expressed as the oxide(s) thereof," is the fact that the alkali metal constituent of the alkali metal oxide(s) e.g., lithium oxide ($Li_2O$), alkaline earth metal oxide(s), e.g., barium oxide (BaO) and alkaline earth metal hydroxide, e.g., barium hydroxide ($Ba(OH)_2$) all possess a total number of equivalents of alkali metal or alkaline earth metal of two. The total number of equivalents of alkali metal in an alkali metal hydroxide, e.g., lithium hydroxide (LiOH), however, is one. Accordingly, it has been discovered that when an alkali metal hydroxide is employed as an alkali metal compound in combination with a glass-forming oxide to comprise the molten media of the instant invention, it is necessary to employ two moles of alkali metal hydroxide(s) for each mole of glass-forming oxide in order to achieve the same advantages exhibited by a molten media containing a glass-forming oxide in combination with one mole of either an alkali metal oxide, alkaline earth metal oxide or alkaline earth metal hydroxide. Therefore, it is evident that it is necessary to employ twice as many moles of an alkali metal hydroxide as compared to alkali metal oxide(s) or alkaline earth metal oxide(s) or hydroxide(s) in order to achieve the identical mole ratio of alkali metal compound to the glass-forming oxide. Hence, when the mole ratio of the alkali metal compound is expressed as the oxide of the particular alkali or alkaline earth metal employed, the singular effect is that the number of moles of alkali metal hydroxides that are employed in the molten media must be divided by two and then combined with the total number of moles of alkali metal oxides and alkaline earth metal oxides and hydroxides in order to determine the total number of moles of alkali metal compound expressed as oxide that are employed in a particular molten media. Thereafter, the total number of moles of the alkalai metal compound is divided by the total number of moles of the glass-forming oxide(s) that is present in the molten media in order to determine the mole ratio of the alkali metal compound to the glass-forming oxide component in the melt.

Still further, it has been discovered that when an oxide of boron is employed as the glass-forming oxide, that the ability of the melt to absorb sulfur oxides from a hot combustion gas is related not only to the mole ratio of the alkali or alkaline earth metal oxide or hydroxide to the oxide of boron but, in addition, to the mole ratio of the different alkali or alkaline earth metal oxides that are employed. Accordingly, it has been found that the ability of the molten media containing an oxide of boron to absorb sulfur oxides is directly related to the basicity of the molten medium in accordance with the following equation:

Basicity ($R'$) = $0.25\ Li_2O + 0.67\ Na_2O + 0.9\ K_2O + 0.32\ [MgO + 0.27\ CaO + 0.34\ SrO + 0.51\ BaO/1.0\ B_2O_3]$ (I)

The basicity ($R'$), which is a modified mole ratio of the alkali and alkaline earth oxides to the oxide of boron and is equivalent to the mole ratio of the component times the appropriate weight factors as specified in Equation I above, should be maintained at a level of at least about 0.40, and more preferably at least about 0.50, and most preferably in the range from about 0.50 to about 0.90 in order that the molten media may absorb essentially all, i.e., above 90 percent, of the sulfur oxides present in the hot combustion gases.

The hot combustion gases which can be treated in accordance with the instant invention include any hot combustion gas containing a sulfur oxide impurity. Such hot combustion gases may be formed by the combustion of coal, coke, fuel oil and other carbonaceous materials containing sulfur impurities, as well as flue gases produced in the chemical and petroleum refinery processes. While not wishing to be bound by any particular theory, it is believed that when a hot combustion gas is contacted with the glass-forming melt of the instant invention that the sulfur predominantly in the form of sulfur oxides such as sulfur dioxide and sulfur trioxide is absorbed by the melt in accordance with the following equation: $M_2O \cdot B_2O_3 + SO_2 \rightarrow M_2SO_3 + B_2O_3$ (II)

wherein boron oxide is shown as the glass-forming oxide and wherein M defines an alkali or alkaline earth metal. The alkali or alkaline earth metal sulfite is thereafter believed to disproportionate in accordance with the following equation: $4\ M_2SO_3 \rightarrow 3\ M_2SO_4 + M_2S$ (III)
In addition, when the sulfur reactions in the glass-forming melts are being conducted in the presence of oxygen, the following oxidation reactions are also believed to be occurring: $2\ M_2SO_3 + O_2 \rightarrow 2\ M_2SO_4$
$M_2S + 2\ O_2 \rightarrow M_2SO_4$ (IV)

While this invention is concerned with removing sulfur oxide from hot combustion gases in molten glass media in the manner described above, a further advantage of employing the glass-forming melts of the instant invention in order to desulfurize a hot combustion gas is the fact that the sulfur impurities absorbed by the melt may be removed and recovered either as elemental sulfur and/or as an essentially dry, highly concentrated hydrogen sulfide stream. As is disclosed and claimed in U.S. Ser. No. 280,184, filed Aug. 14, 1972, now U.S. Pat. No. 3,835,033 which disclosure is hereby incorporated by reference, when the alkali or alkaline earth metal sulfates and sulfites present in the molten media are contacted with a reducing agent such as carbon, hydrogen, carbon monoxide and the like in order to reduce the alkali metal sulfate and sulfite to the corresponding sulfide form and thereafter contacted with steam at elevated temperatures, i.e., above about 1000°F., the sulfur is recovered from the melt as elemental sulfur and/or an essentially dry, hydrogen sulfide rich stream. The formation of elemental sulfur is favored when the metal sulfide is contacted with steam at elevated temperatures in the presence of an alkali or alkaline earth metal sulfate, sulfite, sulfur dioxide or oxygen. In addition, as disclosed in U.S. Ser. No. 280,184, filed Aug. 14, 1972, now U.S. Pat. No. 3,835,033 the glass-forming melts containing an alkali or alkaline earth metal sulfide may also be contacted with a gaseous stream containing carbon dioxide and water at either room temperature or elevated temperatures in order to remove the sulfur from the glass-forming molten media. Accordingly, it can be seen that this advantageous property of the glass-forming melts allows one to recover the sulfur values from the hot combustion gases while at the same time regenerating the molten glass media for further use in the above-described desulfurization process.

The conditions under which the hot combustion gases are contacted with the glass-forming molten media is not a critical feature of the instant invention. Normally, the hot combustion gases containing sulfur oxides as an impurity are contacted with the molten media at a temperature in the range of from about 800° to about 2000°F., more preferably in the range of from about 800° to about 1500°F. The rate at which the hot combustion gases are passed to the molten media may vary in the range from about 0.01 w./w./hr. (weight of flue gas/weight of molten media/hour) to about 50 w./w./hr., and more preferably in the range of from about 0.01 to about 10 w./w.hr. The pressure at which the above-described operation is conducted is not a critical variable and generally, the pressure in the contacting zone when the hot combustion gases are passed through a bed of glass-forming media is in the range of from about atmospheric to about 1000 psig, more preferably in the range of from about atmospheric to about 100 psig.

In effectuating the absorption of $SO_2$ from hot combustion gases, the only requirement of the molten media of this invention is that the molten media contain a sufficient mole ratio of alkali or alkaline earth metal oxide or hydroxide to the glass-forming oxide in order to obtain the necessary degree of $SO_2$ absorption required. The use of the term glass-forming oxide is not meant to imply that all of the molten media described above could be readily cooled without crystallizing, that is, upon cooling having the melt form a solid glass in the classical sense. While certain of the molten media of this invention can, in fact, form a solid glass upon cooling, others are well outside the classical solid glass-forming region. While the glass-forming oxides in combination with an alkali or alkaline earth metal oxide or hydroxide may be employed alone as the active adsorbent, it is clear that the molten media of this invention may be put in combination with other components such as metallic and nonmetallic oxides, sulfides, sulfates, and various other salts in varying amounts. Typical examples of the molten media of the instant invention containing alkali or alkaline earth metal oxides or hydroxides and mixtures thereof in combination with the glass-forming oxide are shown in Table I following:

TABLE I

| Molten Glass Mixture | Composition, Mole Ratio | Approximate Melting Point, °F. |
|---|---|---|
| $Na_2O \cdot B_2O_3$ | 2/1 | 1157 |
| $Li_2O \cdot K_2O \cdot B_2O_3$ | 0.5/0.5/1 | 1070 |
| $Li_2O \cdot Na_2O \cdot B_2O_3$ | 0.5/0.5/1 | 1140 |
| $Li_2O \cdot Cs_2O \cdot B_2O_3$ | 0.3/0.7/1 | 1076 |
| $K_2O \cdot V_2O_5$ | 0.6/1 | 734 |
| $Li_2O \cdot Na_2O \cdot WO_3$ | 1.1/1/2.1 | 917 |
| $K_2O \cdot Li_2O \cdot MoO_3$ | 0.4/1/1.4 | 955 |
| $Na_2O \cdot SiO_2 \cdot B_2O_3$ | 0.8/0.8/1 | 968 |
| $Li_2O \cdot MgO \cdot B_2O_3$ | 1.6/0.4/1 | 1450 |
| $Li_2O \cdot BaO \cdot B_2O_3$ | 1.6/0.4/1 | 1150 |
| $MgO \cdot BaO \cdot B_2O_3$ | 1.2/0.8/1 | 1600 |

It is to be understood that although the molten medium of the instant invention is described in terms of the glass-forming and alkali or alkaline earth metal oxide or hydroxide components thereof, it is clearly within the scope of this invention to employ and define the molten media of this invention with respect to the compounds which are believed to be formed when a glass-forming oxide is heated to the molten state in combination with an alkali metal oxide. For example, a molten media containing lithium oxide and potassium oxide as the alkali metal oxides and boron oxide as the glass-forming oxide in the following mole ratios, 0.53 $Li_2O$, 0.47 $K_2O$, 1.0 $B_2O_3$, can also be expressed in the molten state as an alkali metal borate, specifically a lithium potassium metaborate on the basis of the following reaction:

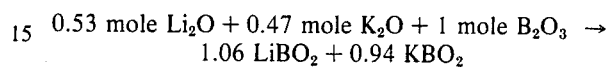

Hence, when a molar excess of the glass-forming oxide ($B_2O_3$) is employed, the melt may comprise a glass-forming oxide in combination with an alkali metal borate in accordance with the following reaction:

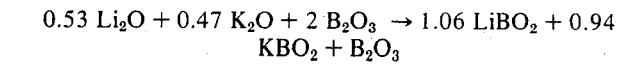

Accordingly, it is clearly within the purview of the instant invention to employ as the stable molten medium of this invention a glass-forming oxide, as defined above, in combination with an alkali metal compound wherein the alkali metal compound comprises either an alkali metal oxide or hydroxide, an alkaline earth metal oxide or hydroxide, or an alkali metal salt of the metal glass-forming oxide employed, e.g., alkali or alkaline earth metal borate. It is to be understood that any of the molten glass melts of this invention may be prepared by fusing any combination of raw materials, which upon heating will form a glass-forming oxide in combination with an alkali or alkaline earth metal oxide or hydroxide. Typically, the composition of a molten glass melt of the instant invention is achieved by mixing a glass-forming oxide with an alkali or alkaline earth metal hydroxide, carbonate or the like and thereafter heating the mixture to a molten state.

While the initial charge of the molten media to the desulfurization zone may consist solely of an alkali or alkaline earth metal oxide or hydroxide in combination with a glass-forming oxide as described above, it is to be understood that the desulfurization of a hot combustion gas stream in such a molten media in accordance with the processing scheme of the instant invention will necessarily result over a prolonged period of time in varying the overall composition of the melt. For example, during the desulfurization of a hot combustion gas stream, a portion of the carbon dioxide that is present in the combustion gas is absorbed by the melt. A fraction of this portion of carbon dioxide that is absorbed by the melt forms a carbonate in the melt, and predominantly an alkali or alkaline earth metal carbonate depending upon the specific alkali or alkaline earth metal oxide or hydroxide that is employed as the alkali or alkaline earth metal component of the molten media of the instant invention. The extent of the absorption of carbon dioxide by the molten glass media and thus the amount of carbonate that is formed in the melt of the instant invention is a function of the mole ratio of the alkali metal component to the glass-forming component, the specific alkali metal component employed, as well as the temperature of the melt and the carbon dioxide partial pressure existing over the bed of the molten media. As mentioned above, after a prolonged period of conducting the gasification process in the molten media of the instant invention such as will occur in a commercial unit, an equilibrium carbonate concentration will exist in the melt. The equilibrium carbonate concentration in any glass-forming melt will generally increase as the mole ratio of alkali metal oxide or hydroxide to glass-forming oxide increases, as the molecular weight of the cation increases, i.e., a melt containing potassium will absorb more carbon dioxide than a melt containing sodium, and a melt containing sodium will absorb more carbon dioxide than a melt containing lithium. The carbonate concentration predominantly in the form of alkali or alkaline earth metal carbonates in molten media of the instant invention is preferably kept to a minimum and, depending on the factors indicated above, will comprise below about 30 weight percent of the melt, preferably below about 20 and more preferably below about 15 weight percent of the melt.

It should be noted that the presence of such alkali and alkaline earth metal sulfides, sulfates, sulfites, carbonates as well as ash components in the molten media of the instant invention will effectively alter, to a slight degree, the mole ratio of the alkali or alkaline earth metal oxide or hydroxide component to the glass-forming oxide component, as well as the basicity of the melt from the initial mole ratio and/or basicity of the molten media that was initially charged to the desulfurization zone. For example, the existence of an equilibrium carbonate concentrattion in the molten media as well as the presence of metal sulfates and sulfides will effectively lower, to a slight degree, the initial mole ratio of the alkali metal component to the glass-forming component which was charged to the desulfurization zone. Accordingly, the critical mole ratios, as well as the basicity, disclosed and claimed herein defines that mole ratio of the alkali metal compound expressed as the oxide thereof to the glass-forming oxide and basicity that must be maintained in the molten media in the desulfurization zones in the presence of the above-mentioned carbonate compounds, sulfur compounds, and ash components in order to obtain the advantages of the instant invention. By this is meant that after continuous cracking and gasification operations wherein a buildup of contaminants such as sulfur and carbonate compounds, coke, ash and the like occurs in the melt, the mole ratio of alkali metal compound to glass-forming compound does not include that amount of alkali metal compound that is present in these contaminants. Accordingly, due to the buildup of these contaminants in the melt and the loss, to a slight degree, of a small amount of alkali metal compound and thus a slight reduction in the mole ratio of the alkali metal compound to the glass-forming compound, it may be necessary to add additional amounts of alkali metal compound to the melt in order to maintain a specifically desired mole ratio of the alkali metal compound to the glass-forming oxide in the melt.

This invention will be further understood by reference to the following examples.

EXAMPLE 1

A number of experiments were conducted wherein a flue gas containing 0.5 vol. percent sulfur dioxide; 23.1 vol. percent carbon dioxide; 3.3 vol. percent oxygen and 73.1 vol. percent nitrogen was passed through various glass-forming melts at a rate of 3 liters/minute at standard temperature and pressure. The temperature of the glass-forming oxide melt was maintained at 1400°F. The ability of the various glass-forming melts of the instant invention to absorb sulfur oxides was as follows:

TABLE II

EFFECT OF GLASS FORMING OXIDES ON FLUE GAS DESULFURIZATION 400 g Melt in Silicon Carbide Reactor; Temperature: 1400°F. Flue Gas Flow Rate: 3 STP l/min; Flue Gas: 0.5 vol% $SO_2$/23.1% $CO_2$/3.3% $O_2$/73.1% $N_2$

| Melt | Mole Ratio $Li_2O$/Other Basic Oxide | R Number | $SO_2$ in Reactor Effluent, vppm* |
|---|---|---|---|
| Li/K Phosphate | 60/40 | 1.5 | 6800 |
| K Vanadate | — | 1.5 | 20 |
| Li/Na Molybdate | 50/50 | 0.75 | 5500 |
| Li/Na Molybdate | 50/50 | 1.5 | 16 |
| Li/Na Tungstate | 50/50 | 1.5 | 20 |
| Li/Ba Borate | 80/20 | 2.0 | 300 |

*at 30 min. on stream

As can be seen from the results as shown in Table II, as the mole ratio of the alkali metal oxide to the glass-forming oxide (R Number) increases, the ability of the glass-forming oxide melts in the instant invention to absorb sulfur oxides likewise increases.

EXAMPLE 2

This example shows the effect of increasing the mole ratio of the alkali metal oxide to the glass-forming oxide (R Number) as well as the effect of the basicity (R') in effectuating the absorption of sulfur oxides by the molten media of the instant invention.

TABLE III

EFFECT OF ALKALI METAL BORATE MELT BASICITY ON FLUE GAS DESULFURIZATION 400 g Melt in Silicon Carbide Reactor; Temperature: 1400°F. Flue Gas Flow Rate: 3 STP l/min

| Melt | Mole Ratio $Li_2O$/$Na_2O$ + $K_2O$ | R Number | Basicity $R^1$ | $SO_2$ in Reactor Effluent, vppm** |
|---|---|---|---|---|
| Runs | | | | |
| (1) Flue gas*: 1.2 vol % $SO_2$/13.8% $CO_2$/10.5% $O_2$/74.5% $N_2$ | | | | |
| Li/K | 80/20 | 1.0 | 0.38 | 2800 |
| Li/Na | 60/40 | 1.0 | 0.42 | 1200 |
| Li/K | 80/20 | 1.4 | 0.53 | 110 |
| Li/Na | 70/30 | 1.4 | 0.54 | 95 |
| Li/Na | 70/30 | 2.0 | 0.75 | 12 |
| Li/K | 80/20 | 2.0 | 0.76 | 8 |
| Li/Na | 60/40 | 2.0 | 0.84 | 12 |
| (2) Flue Gas: 1.0 vol % $SO_2$/12.2% $CO_2$/3.6% $O_2$/83.1% $N_2$ | | | | |
| Li/Na | 60/40 | 1.4 | 0.59 | 88 |
| Li/Na | 60/40 | 2.0 | 0.84 | 19 |
| (3) Flue Gas: 0.9 vol % $SO_2$/11.0% $CO_2$/3.3% $O_2$/75.3% $N_2$/9.4% $H_2O$ | | | | |
| Li/Na | 60/40 | 2.0 | 0.84 | 20 |

**at 30 minutes on stream
*1 vol % $SO_2$ = 10,000 vppm

As can be seen from the results as shown in Table III, wherein the amount of sulfur dioxide in the reactor effluent is measured with a Dorman microcoulometer it can be seen that as the mole ratio of the alkali metal oxide to the glass-forming oxide the R Number and basicity i.e. R' of the molten media increases, the amount of $SO_2$ in the reactor effluent decreases to a significant degree.

In addition, it can be seen in Run 2 that decreasing the oxygen concentration in the synthetic flue gas from 10.5 vol. percent to 3.6 vol. percent does not significantly affect the amount of sulfur oxides in the reactor effluent. Likewise, in Run 3 it can be seen that the addition of water to the synthetic flue gas does not significantly affect the ability of the glass-forming oxide melts, namely an oxide of boron in this instance, to remove sulfur oxide from a flue gas stream.

EXAMPLE 3

This example shows the ability of the glass-forming melts of the instant invention to absorb sulfur oxide from a hot combustion gas thereafter to be regenerated with water to recover sulfur from the molten media and thus regenerate the melt for continuous use in the process. A glass-forming melt was prepared wherein an oxide of boron was employed as the glass-forming oxide and lithium oxide and sodium oxide were employed as the alkali metal oxide in a mole ratio of 70 moles of lithium oxide per 30 moles of sodium oxide. The mole ratio of the alkali metal oxide to the oxide of boron was 2, i.e. R Number of the melt =2. 225 Grams of this molten media was heated to a temperature of 1400°F. in a graphite reactor. Thereafter, the melt was contacted with a synthetic flue gas containing 3 vol. percent of sulfur dioxide in nitrogen for 2 hours at a rate of 2 liters/minute under standard temperature and pressure conditions. The absorption of sulfur dioxide was essentially complete over the first 1 ½ hours as determined by measuring the amount of sulfur compounds in the effluent gas with a Dorman microcoulometer. The molten media containing absorbed sulfur compounds were then contacted with 10 grams of fluid coke for a period of 2 ½ hours in order to reduce the alkali metal sulfates and sulfites to their sulfide form. Thereafter, the melt was treated with 0.5 grams/minute of steam. The steam effectuated the formation of an essentially dry, highly concentrated hydrogen sulfide stream such that the desulfurization rate of the melt was in the range of 1.8 percent per minute. Accordingly, it can be seen that the glass-forming molten media of the instant invention provides a continuous process for both the sulfur absorption from a hot combustion gas, the subsequent removal of the sulfur impurities from the melt, as well as the regeneration of the melt for further use in the process.

EXAMPLE 4

This example shows that the glass-forming melts of the instant invention are effective in removing nitric oxide as well as sulfur oxides from a high combustion gaseous stream.

TABLE IV

NITRIC OXIDE ABSORPTION BY BORATE MELTS

Melt: 400 g Li/Na R = 1.4 Borate, $Li_2O/Na_2O$
Mole Ratio = 68/32; Basicity (R') = 0.54;
Temperature: 1400°F; Feed Gas: 1 STP l/min
NO in $N_2$ NITRIC OXIDE (NO) CONCENTRATION, vppm

| Feed | Reactor Exit |
|---|---|
| 1000 | 10 |

As can be seen from the results as shown in Table IV, the glass-forming melts of the instant invention are also effective in absorbing nitrogen oxides, specifically nitric oxide from a flue gas stream.

What is claimed is:

1. A process for removing sulfur oxide from a hot combustion gas which comprises contacting said hot combustion gas with a molten media containing a glass-forming oxide selected from the group consisting of oxides of boron, molybdenum, tungsten, phosphorous and mixture thereof in combination with an alkali metal compound selected from the group consisting of alkali metal oxides, alkali metal hydroxides, alkaline earth metal oxides, alkaline earth metal hydroxides and mixtures thereof at a temperature in the range of from above about the melting point of said molten media to about 2000°F., the mole ratio of the alkali metal compound expressed as the oxide thereof to the glass-forming oxide being within the range from about 1 to about 3.0.

2. A process for removing sulfur dioxide from a hot combustion gas which comprises contacting said combustion gas with a molten media containing a glass-forming oxide selected from the group consisting of an oxide of boron, phosphorus, molybdenum, tungsten and mixtures thereof in combination with an alkali metal compound selected from the group consisting of alkali metal oxides, alkaline earth metal oxides, alkali metal hydroxides, alkaline earth metal hydroxides and mixtures thereof wherein the mole ratio of the alkali metal compound expressed as the oxide thereof to the glass-forming oxide is within the range from about 1 to about 3, at a temperature in the range of from about above the melting point of said media to about 2000°F. in order to absorb the sulfur dioxide in said molten media in the form of sulfur compounds selected from the group consisting of alkali metal sulfites, alkaline earth metal sulfites, alkali metal sulfates, alkaline earth metal sulfates and mixtures thereof; reducing said sulfur compounds to their corresponding sulfide form and thereafter contacting said sulfides with steam at a temperature up to about 1800°F.

3. A process for removing sulfur oxide from a hot combustion gas which comprises contacting said hot combustion gas with a molten media at a temperature in the range of from about above the melting point of said media to about 2000°F., said molten media containing an oxide of boron in combination with an alkali metal compound selected from the group consisting of alkali metal oxides, alkali metal hydroxides, alkaline earth metal oxides, alkaline earth metal hydroxides and mixtures thereof, the mol ratio of the alkali metal compound expressed as the oxide thereof to the oxide of boron in said molten media being within the range from about 1 to about 3.

4. The process of claim 3 wherein the basicity of the molten media is at least 0.40.

5. A process for removing sulfur dioxide from a hot combustion gas which comprises contacting said combustion gas with a molten media at a temperature in the range from above about the melting point of said media to about 2000°F. in order to absorb the sulfur dioxide in said molten media in the form of sulfur compounds selected from the group consisting of alkali metal sulfites, alkaline earth metal sulfites, alkaline metal sulfates, alkaline earth metal sulfates, and mixtures thereof; reducing said sulfur compounds to their corresponding sulfide form and thereafter contacting said sulfides with steam at a temperature up to about 1800°F., said molten media containing an oxide of boron in combination with an alkali metal compound selected from the group consisting of alkali metal oxides, alkaline earth metal oxides, alkali metal hydroxides, alkaline earth metal hydroxides and mixtures thereof, the mol ratio of the alkali metal compound expressed as the oxide thereof to the oxide of boron in said molten media being within the range from about 1 to about 3.

6. The process of claim 5 wherein the basicity of the molten media is at least 0.40.

7. The process of claim 6 wherein the molten media contains an alkali metal borate.

8. The process of claim 7 wherein the temperature of the molten media is maintained in the range of from about 800° to about 1800°F.

9. The process of claim 8 wherein the sulfides are contacted with steam at a temperature in the range of from about 800° to about 1800°F.

* * * * *